(12) United States Patent
Ma et al.

(10) Patent No.: US 7,647,162 B2
(45) Date of Patent: Jan. 12, 2010

(54) UTILIZED FUNCTION FOR FUEL DYNAMICS DURING ENGINE START AND CRANK-TO-RUN TRANSITION

(75) Inventors: Qi Ma, Farmington Hills, MI (US); Stephen Yurkovich, Columbus, OH (US); Kenneth P. Dudek, Rochester Hills, MI (US); Stephen K. Fulcher, Clovis, NM (US); Robert X. Monchamp, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 817 days.

(21) Appl. No.: 11/390,975

(22) Filed: Mar. 28, 2006

(65) Prior Publication Data

US 2007/0056562 A1 Mar. 15, 2007

Related U.S. Application Data

(60) Provisional application No. 60/676,608, filed on Apr. 29, 2005.

(51) Int. Cl.

| | |
|---|---|
| ***G06F 19/00*** | (2006.01) |
| ***F02D 41/04*** | (2006.01) |
| ***F02M 51/00*** | (2006.01) |

(52) U.S. Cl. ........................ 701/104; 123/435; 123/491

(58) Field of Classification Search ................ 123/435, 123/436, 478, 480, 486, 491–493; 701/101–106, 701/110, 113, 115

See application file for complete search history.

(56) References Cited

U.S. PATENT DOCUMENTS

| | | | | |
|---|---|---|---|---|
| 5,249,560 A * | 10/1993 | Gian et al. | .................. | 123/443 |
| 7,171,950 B2 * | 2/2007 | Palma et al. | ................ | 123/435 |
| 7,204,236 B2 * | 4/2007 | Ma et al. | .................... | 123/491 |
| 2004/0084025 A1 | 5/2004 | Zhu et al. | ................... | 123/435 |
| 2006/0243039 A1 * | 11/2006 | Ma et al. | ................... | 73/118.2 |
| 2006/0243255 A1 * | 11/2006 | Ma et al. | .................... | 123/491 |
| 2006/0249122 A1 * | 11/2006 | Ma et al. | .................... | 123/491 |

OTHER PUBLICATIONS

U.S. Appl. No 60/676,606, filed Apr. 29, 2005.

* cited by examiner

*Primary Examiner*—Willis R Wolfe, Jr.

(57) ABSTRACT

A fuel control system for an internal combustion engine includes a first module that determines a corrected injected fuel mass based on an engine temperature and a measured burned fuel mass and a second module that determines a raw injected fuel mass based on the corrected injected fuel mass and the engine temperature. A third module regulates fueling to a cylinder of the engine based on the raw injected fuel mass.

18 Claims, 6 Drawing Sheets

UTILIZED FUNCTION FOR FUEL DYNAMICS DURING ENGINE START AND CRANK-TO-RUN TRANSITION

CROSS-REFERENCE TO RELATED APPLICATIONS

This application claims the benefit of U.S. Provisional Application No. 60/676,608, filed on Apr. 29, 2005. The disclosure of the above application is incorporated herein by reference.

FIELD OF THE INVENTION

The present invention relates to internal combustion engines, and more particularly to regulating fuel to an engine during an engine start and crank-to-run transition.

BACKGROUND OF THE INVENTION

Internal combustion engines combust a fuel and air mixture within cylinders driving pistons to produce drive torque. During engine start-up, the engine operates in transitional modes including key-on, crank, crank-to-run and run. The key-on mode initiates the start-up process and the engine is cranked (i.e., driven by a starter motor) during the crank mode. As the engine is fueled and the initial ignition event occurs, engine operation transitions to the crank-to-run mode. Eventually, when all cylinders are firing and the engine speed is above a threshold level, the engine transitions to the run mode.

Accurate control of fueling plays an important roll in enabling rapid engine start and reduced variation in start time (i.e., the time it takes to transition to the run mode) during the transitional engine start-up. Traditional transitional fuel control systems fail to adequately account for lost fuel and fail to detect and ameliorate misfires and poor-starts during the transitional phases. Further, traditional fuel control systems are not sufficiently robust and require significant calibration effort.

SUMMARY OF THE INVENTION

Accordingly, the present invention provides a fuel control system for an internal combustion engine. The fuel control system includes a first module that determines a corrected injected fuel mass based on an engine temperature and a measured burned fuel mass and a second module that determines a raw injected fuel mass based on the corrected injected fuel mass and the engine temperature. A third module regulates fueling to a cylinder of the engine based on the raw injected fuel mass.

In other features, the measured burned fuel mass is determined based on a commanded equivalency ratio (EQR) and a cylinder air mass. The fuel control system further includes a fourth module that estimates the cylinder air mass based on engine operating conditions.

In another feature, the first module determines the corrected injected fuel mass further based on a previous corrected injected fuel mass, a current measured burned fuel mass and a previous measured burned fuel mass.

In still other features, the second module determines the raw injected fuel mass based on a utilized fuel fraction that is a ratio of the corrected injected fuel mass to the raw injected fuel mass. The utilized fuel fraction is determined based on a scalar function that is a ratio of the measured burned fuel mass and the raw injected burned fuel mass that is determined at a threshold engine cycle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
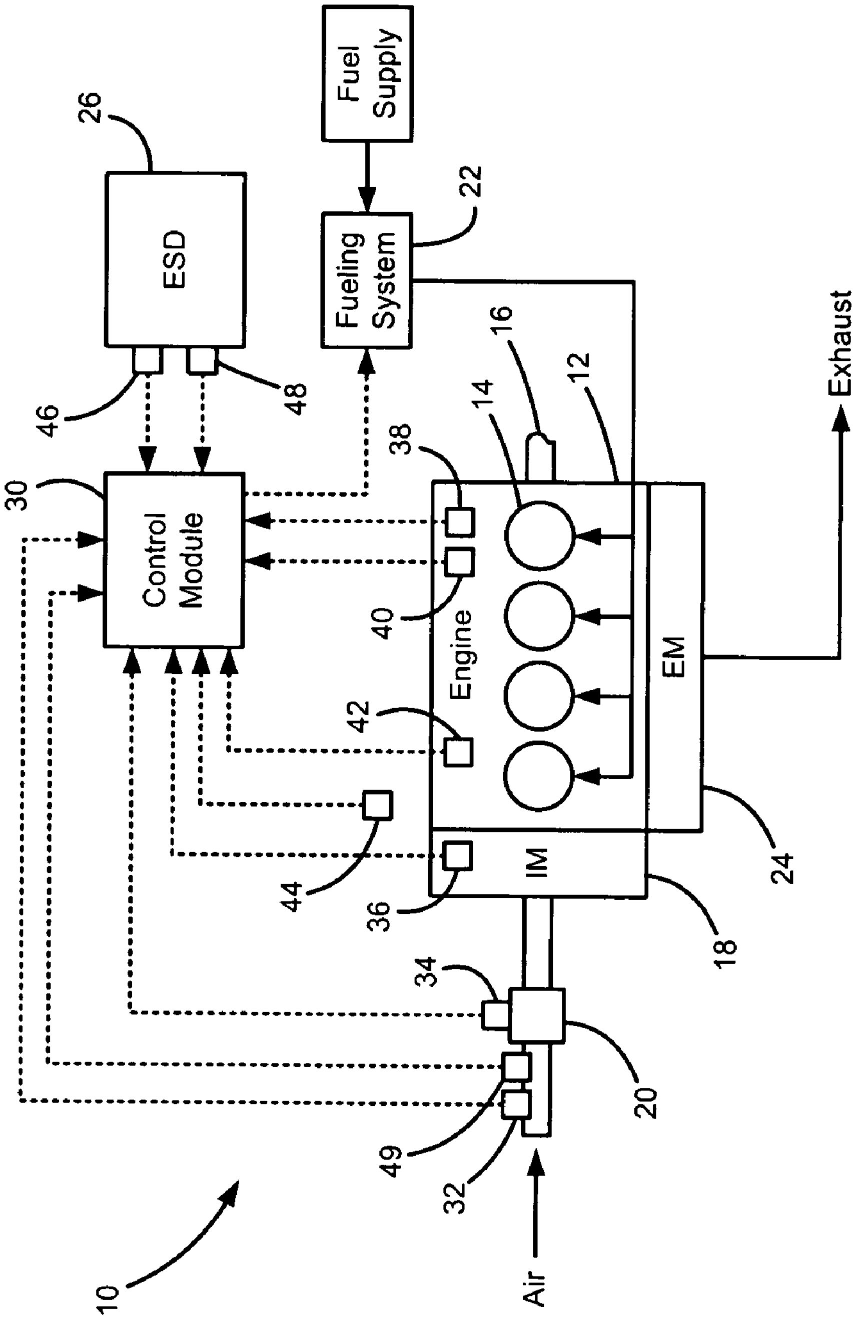
FIG. 1 is a schematic illustration of an exemplary engine system that is regulated using the transitional fuel control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle system 10 is schematically illustrated. The vehicle system includes an engine 12 that combusts a fuel and air mixture within cylinders 14 to drive pistons slidably disposed within the cylinders 14. The pistons drive a crankshaft 16 to produce drive torque. Air is drawn into an intake manifold 18 of the engine 12 through a throttle 20. The air is distributed to the cylinders 14 and is mixed with fuel from a fueling system 22. The air and fuel mixture is ignited or sparked to initiate combustion. Exhaust produced by combustion is exhausted from the cylinders 14 through an exhaust manifold 24. An energy storage device (ESD) 26 provides electrical energy to various components of the vehicle system. For example, the ESD 26 provides electrical energy to produce spark and provides electrical energy to rotatably drive the crankshaft 16 during engine start-up.

A control module 30 regulates overall operation of the vehicle system 10. The control module 30 is responsive to a plurality of signals generated by various sensors, as described in further detail below. The control module 30 regulates fuel flow to the individual cylinders based on the transitional fuel control of the present invention during transitions across a key-on mode, a crank mode, a crank-to-run mode and a run mode. More specifically, during engine start-up, the initial mode is the key-on mode, where a driver turns the ignition key to initiate engine start-up. The crank mode follows the key-on mode and is the period during which a starter motor (not illustrated) rotatably drives the pistons to enable air processing in the cylinders 14. The crank-to-run mode is the period during which the initial ignition event occurs prior to normal engine operation in the run mode.

The vehicle system 10 includes a mass air flow (MAF) sensor 32 that monitors the air flow rate through the throttle 20. A throttle position sensor 34 is responsive to a position of a throttle plate (not shown) and generates a throttle position signal (TPS). An intake manifold pressure sensor 36 generates a manifold absolute pressure (MAP) signal and an engine speed sensor 38 generates and engine speed (RPM) signal. An engine oil temperature sensor 40 generates an engine oil temperature ($T_{OIL}$) signal and an engine coolant temperature sensor 42 generates an engine coolant temperature (ECT) signal. A pressure sensor 44 is responsive to the atmospheric pressure and generates a barometric pressure ($P_{BARO}$) signal. Current and voltage sensors 46,48, respectively, generate current and voltage signals of the ESD 26. An intake air temperature (IAT) sensor 49 generates an IAT signal.

The transitional fuel control of the present invention calculates a raw injected fuel value (RINJ) based on a commanded or measured burned fuel mass (MBFM) (i.e., the desired in-cylinder burned fuel mass). MBFM is determined based on a cylinder air charge (GPO) as detailed in commonly assigned and co-pending U.S. Pat. App. Ser. No. 60/676,606, filed on Apr. 29, 2005 and entitled Model-based Fuel Control for Engine Start and Crank-to-Run Transition, the disclosure of which is expressly incorporated herein by reference.

Figure 2:
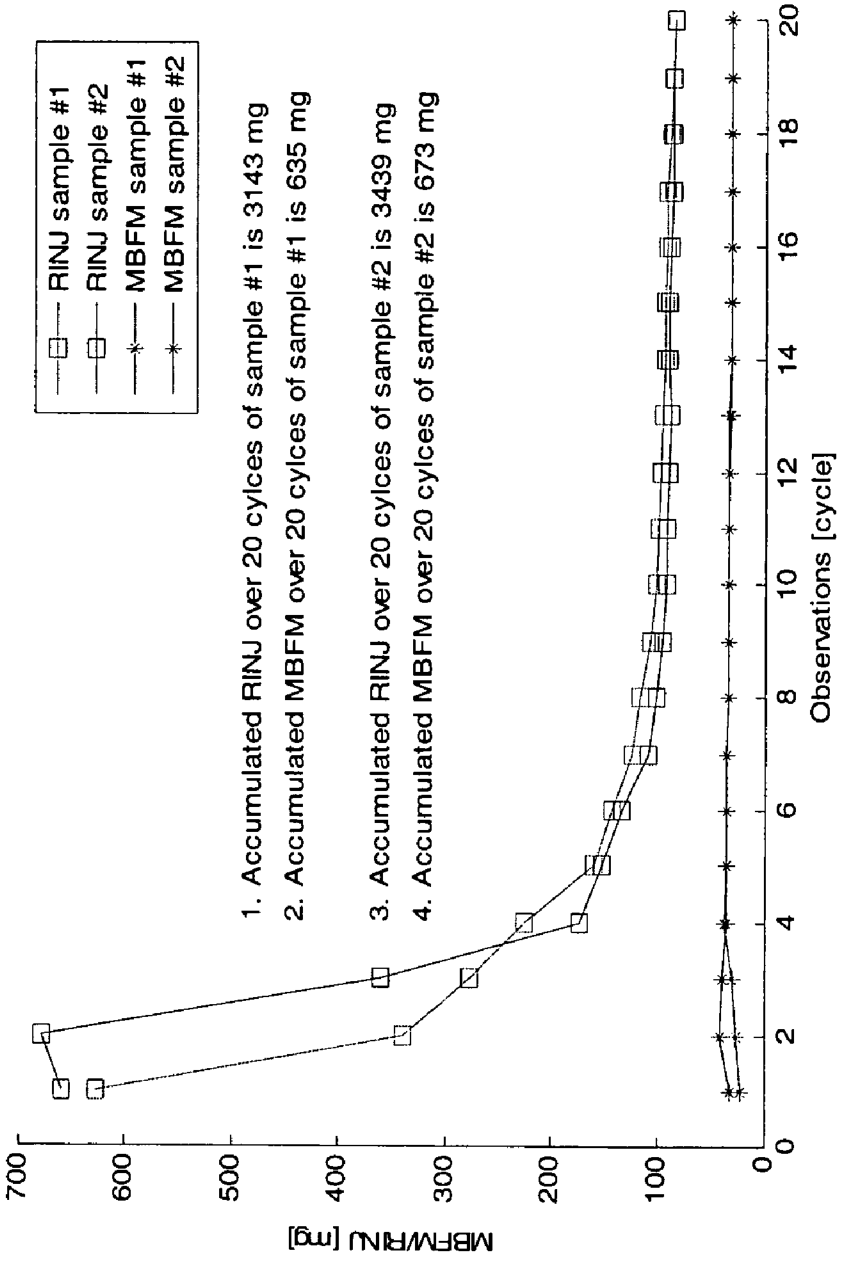
FIG. 2 is a graph illustrating multiple exemplary raw injected fuel mass (RINJ) samples and corresponding exemplary measured burned fuel mass (MBFM) samples for an engine over an exemplary observation period.
Figure 3:
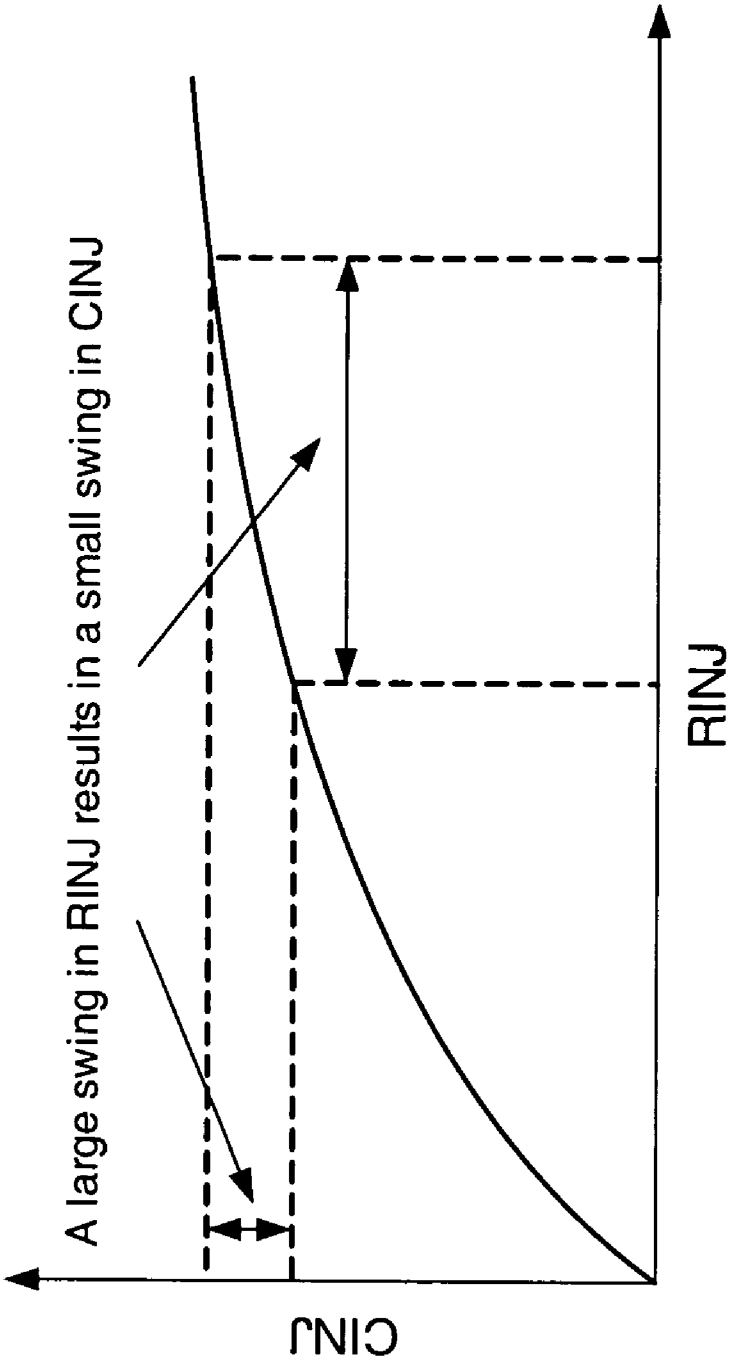
FIG. 3 is a graph illustrating an exemplary curve of RINJ versus corrected injected fuel mass (CINJ) calculated based on the transitional fuel control of the present invention.
Figure 4:
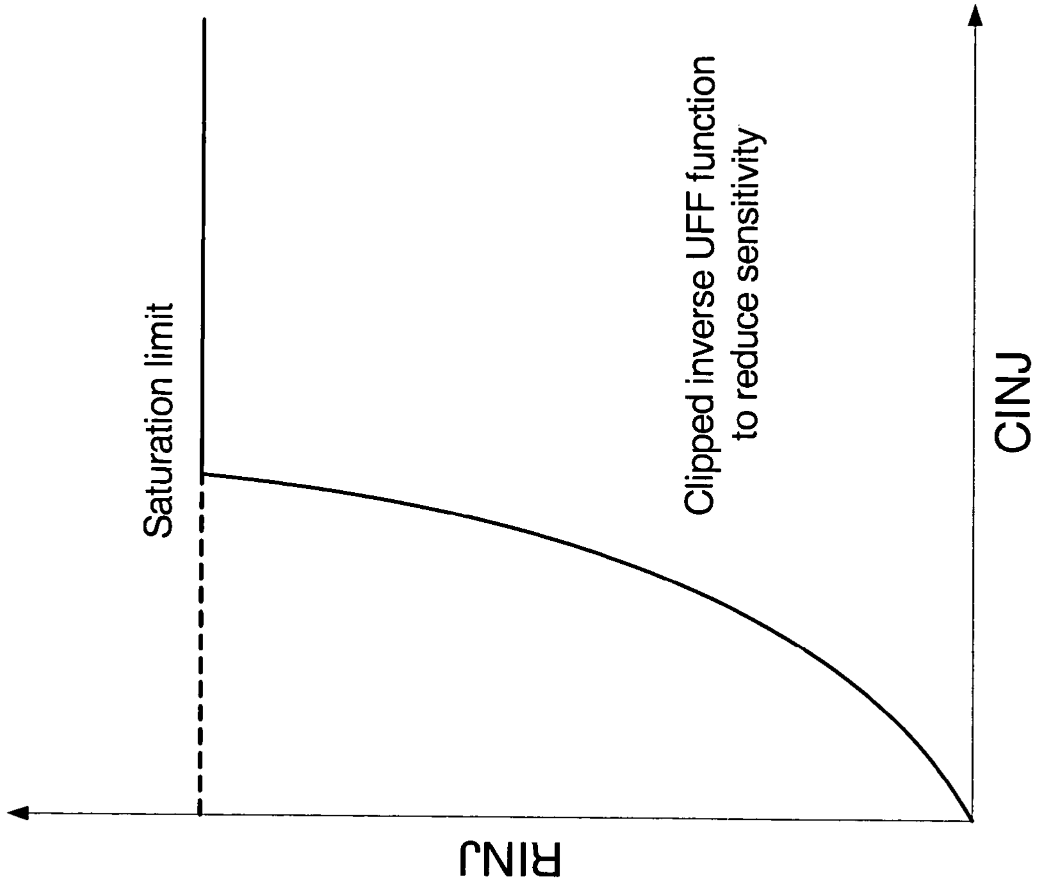
FIG. 4 is a graph illustrating an exemplary curve of CINJ versus RINJ calculated based on an inverted utilized fuel fraction (UFF) and including a saturation limit.

Referring now to FIGS. 2 through 4, the transitional fuel control will be discussed in further detail. The transitional fuel control includes a utilized fuel fraction (UFF) function and a nominal fuel dynamics compensation (NFDC) function. The UFF and NFDC functions provide cascaded components for engine operation during the crank-to-run transition phase of engine start-up. The period crank-to-run refers to the period between initial engine cranking and engine running.

With particular reference to FIG. 2, the UFF is the percentage of fuel actually burned in the current combustion event and is based on experimental observations. More specifically, the measured burned fuel mass MBFM UFF is a fraction of the RINJ or the ratio of MBFM to RINJ. There is an amount of RINJ which does not participate in the combustion process. The effect of such a phenomenon is illustrated in FIG. 2 where the total amount of RINJ does not show up in the exhaust measurement and an effect of diminishing return is observed. This incomplete fuel utilization phenomenon indicates that the utilization rate is not a constant number and is a function of RINJ for a fixed ECT.

The transitional fuel control of the present invention models this crucial nonlinearity by separating the overall fuel dynamics into two cascaded subsystems: nonlinear input (RINJ) dependent UFF and a unity-gained nominal fuel dynamics function. The input (i.e., RINJ and ECT)) dependent UFF function is provided as:

$$UFF = UFF_{SS}(ECT)\left(1 - \frac{2}{\pi}\arctan\left(\frac{RINJ(k)}{\gamma(ECT)}\right)\right) \tag{1}$$

where $UFF_{SS}(ECT)$ is an ECT dependent scalar function defined as the ratio between MBFM and RINJ measured at Cycle SS. The sub-script SS indicates the cycle at which the engine air dynamics achieve a steady/state. Although an exemplary value of SS is equal to 20 (i.e., the $20^{th}$ cycle), it is appreciated that this value can vary based on engine specific parameters. Also, RINJ(k) is the value of RINJ indexed at the k-th engine cycle. γ(ECT) is an ECT dependant parameter that is calibrated for different values of ECT. $UFF_{20}(ECT)$ is a scaling factor that accounts for the steady state utilization rate. The ratio between MBFM and RINJ at Cycle 20 is a convenient estimate for the steady state utilization rate because the relationship between MBFM and RINJ has stabilized at this point. However, it is appreciated that Cycle 20 is merely exemplary in nature and that any other cycle or cycles could be used instead.

Based on the UFF as defined above, CINJ(k) (i.e., the corrected injected fuel mass at engine cycle k) is computed as follows:

$$CINJ(k) = UFF_{20}(ECT)\left(1 - \frac{2}{\pi}\arctan\left(\frac{RINJ(k)}{\gamma(ECT)}\right)\right)RINJ(k) \tag{2}$$

The major benefit gained in using the arctangent form in the UFF function is threefold. First, as with the actual physical phenomena observed, $$\arctan\left(\frac{RINJ(k)}{\gamma(ECT)}\right)$$

is a smooth, monotonic, increasing function with respect to the input RINJ and a decreasing function with respect to the input γ(ECT). Second, the single parameter γ(ECT) is used to characterize a shape that meets the correction requirement to capture the diminishing return effect. The single ECT dependent parameter eases the calibration process and permits a robust parameter estimate when data richness is an issue. Third, the magnitude of γ(ECT) is in the same range of the first indexed RINJ (RINJ(1)) in a normal engine start for a given fixed ECT. Therefore, γ(ECT) is viewed as a weighting parameter for RINJ correction in the first few engine cycles.

Referring now to FIG. 3, the basic characteristic of the UFF function is depicted. More specifically, FIG. 3 illustrates the diminishing return effect and an inherent saturation effect. That is to say, some values of CINJ may not have a corresponding RINJ value within a reasonable range of CINJ and RINJ. This saturation effect becomes important when the UFF is used for control purposes, and is addressed by the second component, the NFDC portion.

Referring now to FIG. 4, the UFF function is inverted for control implementation in determining RINJ. The inverse problem is viewed as a two-input, one-output static mapping function, which is approximated using the technique of linear splines. Because the complete image of RINJ in the inverse UFF approximation may not be attained when CINJ is sufficiently large, saturation limits on RINJ are introduced to realize a one-to-one mapping between CINJ and RINJ at each fixed ECT. FIG. 4 illustrates the implementation of the saturation limit. Another important benefit of implementing the saturation limit is to reduce the sensitivity of the fuel control in the case of poor engine start. In that case, inaccurate prediction of the fresh air charge trapped inside the cylinder (GPO) may result in over compensation with a large CINJ that has no corresponding or feasible RINJ.

With regard to the NFDC function, the forward, mass conservative or unity gained nominal fuel dynamics model is represented using the following equation:

$$y(k)=-\beta_1 y(k-1)+\alpha_0 u(k)+\alpha_1 u(k-1) \quad (3)$$

where y(k) denotes the MBFM and u(k) indicates CINJ. This relationship is subject to a unity constraint: $1+\beta_1=\alpha_0+\alpha_1$. Although the model structure is a first order linear model, the model parameters are a function of ECT. In addition, under a normal engine start, parameters $\alpha_0$, $\alpha_1$ and $\beta_1$ are also mildly influenced by the RPM and MAP. However, under anomalous engine starts, control using such a model structure and parameter setup (i.e., capturing the MAP and RPM effect) can result in inappropriate fuel dynamics compensation due to insufficient accuracy of MAP and RPM predictions. Therefore, the $\alpha_0$, $\alpha_1$ and $\beta_1$ parameters are functions of ECT only. When used in transition fuel control, Equation 3 is inverted to provide:

$$u(k) = -\frac{\alpha_1}{\alpha_0}u(k-1) + \frac{1}{\alpha_0}y(k) + \frac{\beta_1}{\alpha_0}y(k-1) \quad (4)$$

where y(k) is the desired in-cylinder burned fuel mass (i.e., commanded fuel).

Figure 5:
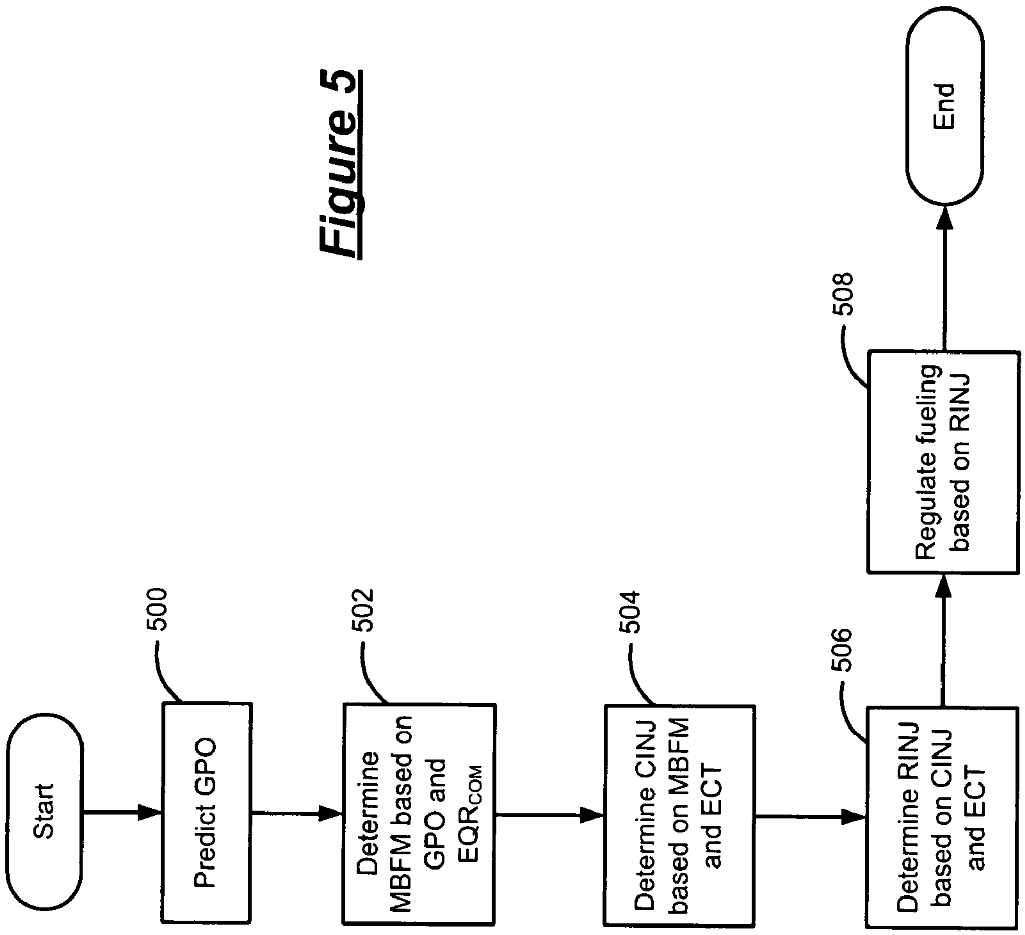
FIG. 5 is a flowchart illustrating exemplary steps executed by the transitional fuel control of the present invention.

Referring now to FIG. 5, exemplary steps executed by the transitional fuel control are illustrated. In step 500, control predicts GPO. In step 502, control determines MBFM based on GPO and a commanded equivalency ratio ($EQR_{COM}$). $EQR_{COM}$ is determined as the ratio of the commanded fuel to air ratio to the stoichiometric fuel to air ratio and is used to negate differences in fuel compositions and to provide robust fueling to the engine in cold start conditions. The stoichiometric fuel to air ratio is the specific air to fuel or fuel to air ratio at which the hydrocarbon fuel is completely oxidized.

In step 504, control determines CINJ based on MBFM and ECT using the inverted NFDC function discussed in detail above. In step 506, control determines RINJ based on CINJ and ECT using the inverted UFF function discussed in detail above. In step 508, control regulates fueling to the engine based on RINJ and control ends.

Figure 6:
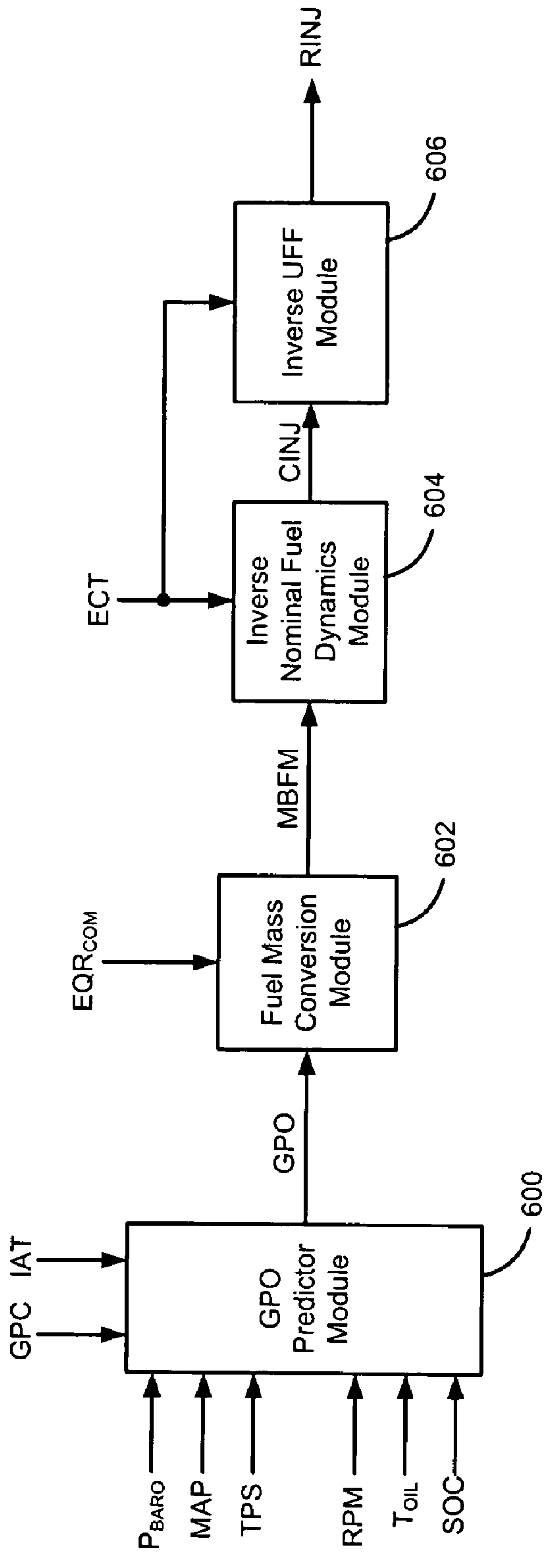
FIG. 6 is a signal flow diagram illustrating exemplary modules that execute the transitional fuel control of the present invention.

Referring now to FIG. 6, exemplary modules that execute the fuel dynamics control are illustrated. Fuel control generally includes the GPO prediction, conversion of the predicted GPO and $EQR_{COM}$ to the fuel mass command, nominal inverse fuel dynamics scheduled based on ECT and inverse UFF function scheduled based on ECT. The modules include, but are not limited to, a GPO predictor module 600, a fuel mass conversion module 602, an inverse nominal fuel dynamics module 604 and an inverse UFF module 606.

The GPO predictor module 600 generates GPO based on $P_{BARO}$, MAP, TPS, RPM, $T_{OIL}$, SOC, GPC and IAT. The fuel mass conversion module 602 determines MBFM based on GPO and $EQR_{COM}$. The inverse nominal fuel dynamics module 604 determines CINJ based on MBFM and ECT. The inverse UFF module 606 determines RINJ based on CINJ and ECT. The cylinders are fueled based on the respective RINJs.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel control system for an internal combustion engine, comprising:

a first module that determines a corrected injected fuel mass based on an engine temperature and a measured burned fuel mass;

a second module that determines a raw injected fuel mass based on said corrected injected fuel mass and said engine temperature; and a third module that regulates fueling to a cylinder of said engine based on said raw injected fuel mass.

2. The fuel control system of claim 1 wherein said first module determines said corrected injected fuel mass further based on a previous corrected injected fuel mass, a current measured burned fuel mass and a previous measured burned fuel mass.

3. The fuel control system of claim 1 wherein said measured burned fuel mass is determined based on a commanded equivalency ratio (EQR) and a cylinder air mass.

4. The fuel control system of claim 3 further comprising a fourth module that estimates said cylinder air mass based on engine operating conditions.

5. The fuel control system of claim 1 wherein said second module determines said raw injected fuel mass based on a utilized fuel fraction that is a ratio of said corrected injected fuel mass to said raw injected fuel mass.

6. The fuel control system of claim 5 wherein said utilized fuel fraction is determined based on a scalar function that is a ratio of said measured burned fuel mass and said raw injected burned fuel mass that is determined at a threshold engine cycle.

7. A method of regulating fuel to an internal combustion engine, comprising:

determining a corrected injected fuel mass based on an engine temperature and a measured burned fuel mass;

determining a raw injected fuel mass based on said corrected injected fuel mass and said engine temperature; and regulating fueling to a cylinder of said engine based on said raw injected fuel mass.

8. The method of claim 7 wherein said corrected injected fuel mass is further determined based on a previous corrected injected fuel mass, a current measured burned fuel mass and a previous measured burned fuel mass.

9. The method of claim 7 wherein said measured burned fuel mass is determined based on a commanded equivalency ratio (EQR) and a cylinder air mass.

10. The method of claim 9 further comprising estimating said cylinder air mass based on engine operating conditions.

11. The method of claim 7 wherein said raw injected fuel mass is further determined based on a utilized fuel fraction that is a ratio of said corrected injected fuel mass to said raw injected fuel mass.

12. The method of claim 11 wherein further comprising calculating said utilized fuel fraction based on a scalar function that is a ratio of said measured burned fuel mass and said raw injected burned fuel mass that is determined at a threshold engine cycle.

13. A method of regulating fuel to an internal combustion engine, comprising:

estimating a cylinder air mass for a combustion event;

calculating a measured burned fuel mass based on said cylinder air mass;

determining a corrected injected fuel mass based on an engine temperature and said measured burned fuel mass;

determining a raw injected fuel mass for said combustion event based on said corrected injected fuel mass and said engine temperature; and regulating fueling to a cylinder of said engine based on said raw injected fuel mass to provide sufficient fuel for said combustion event.

14. The method of claim 13 wherein said measured burned fuel mass is further determined based on a commanded equivalency ratio (EQR).

15. The method of claim 13 wherein said cylinder air mass is estimated based on engine operating conditions.

16. The method of claim 13 wherein said corrected injected fuel mass is further determined based on a previous corrected injected fuel mass, a current measured burned fuel mass and a previous measured burned fuel mass.

17. The method of claim 13 wherein said raw injected fuel mass is further determined based on a utilized fuel fraction that is a ratio of said corrected injected fuel mass to said raw injected fuel mass.

18. The method of claim 17 wherein further comprising calculating said utilized fuel fraction based on a scalar function that is a ratio of said measured burned fuel mass and said raw injected burned fuel mass that is determined at a threshold engine cycle.

* * * * *